(12) United States Patent
Kim et al.

(10) Patent No.: US 9,702,310 B2
(45) Date of Patent: Jul. 11, 2017

(54) METHOD FOR REGENERATING LEAN NOX TRAP OF EXHAUST PURIFICATION SYSTEM PROVIDED WITH LEAN NOX TRAP AND SELECTIVE CATALYTIC REDUCTION CATALYST AND EXHAUST PURIFICATION SYSTEM

(71) Applicant: HYUNDAI MOTOR COMPANY, Seoul (KR)

(72) Inventors: Young Jic Kim, Hwaseong-si (KR); Jungwhun Kang, Incheon (KR); Won Jin Jo, Hwaseong-si (KR)

(73) Assignee: HYUNDAI MOTOR COMPANY, Seoul (KR)

(*) Notice: Subject to any disclaimer, the term of this patent is extended or adjusted under 35 U.S.C. 154(b) by 71 days.

(21) Appl. No.: 14/954,866

(22) Filed: Nov. 30, 2015

(65) Prior Publication Data

US 2017/0074191 A1 Mar. 16, 2017

(30) Foreign Application Priority Data

Sep. 15, 2015 (KR) .................. 10-2015-0130419

(51) Int. Cl.
*F01N 3/20* (2006.01)
*F02D 41/02* (2006.01)
(Continued)

(52) U.S. Cl.
CPC ....... *F02D 41/0275* (2013.01); *F01N 3/0814* (2013.01); *F01N 3/0842* (2013.01); *F01N 3/206* (2013.01); *F01N 3/2066* (2013.01); *F01N 3/0807* (2013.01); *F01N 3/0885* (2013.01); *F01N 13/009* (2014.06); *F01N 2260/04* (2013.01); *F01N 2430/06* (2013.01); *F01N 2560/025* (2013.01); *F01N 2560/026* (2013.01); *F01N 2560/06* (2013.01);
(Continued)

(58) Field of Classification Search
CPC .... F01N 3/0807; F01N 3/0814; F01N 3/0871; F01N 3/0885; F01N 3/2066; F01N 13/009; F01N 2430/06; F01N 2570/14; F01N 2570/18; F01N 2610/02; F01N 2610/1453; F01N 2900/08; F01N 2900/1404; F01N 2900/1602; F01N 2900/1614; F01N 2900/1622
USPC .................. 60/274, 285, 286, 295, 299, 301
See application file for complete search history.

(56) References Cited

U.S. PATENT DOCUMENTS

2006/0010857 A1  1/2006  Hu et al.

FOREIGN PATENT DOCUMENTS

| JP | 2008-506881 A | 3/2008 |
| KR | 10-1406495 B1 | 6/2014 |
| KR | 10-2015-0059535 A | 6/2015 |

*Primary Examiner* — Jorge Leon, Jr.
(74) *Attorney, Agent, or Firm* — McDermott Will & Emery LLP (57) ABSTRACT

A method for regenerating a lean NOx trap (LNT) of an exhaust purification system having the LNT and a selective catalytic reduction (SCR) catalyst includes determining whether a regeneration release condition of the LNT is satisfied; determining whether a regeneration demand condition of the LNT is satisfied; and performing regeneration of the LNT if the regeneration release condition of the LNT and the regeneration demand condition of the LNT are satisfied, wherein satisfaction of the regeneration release condition of the LNT is determined based on an NOx amount absorbed in the LNT, an NH3 amount stored in the SCR catalyst and temperature at an upstream of the SCR catalyst.

16 Claims, 5 Drawing Sheets

(51) Int. Cl.
*F01N 3/08* (2006.01)
*F01N 13/00* (2010.01)
(52) U.S. Cl.
CPC ...... *F01N 2560/08* (2013.01); *F01N 2570/14* (2013.01); *F01N 2570/18* (2013.01); *F01N 2610/02* (2013.01); *F01N 2610/1453* (2013.01); *F01N 2900/08* (2013.01); *F01N 2900/1404* (2013.01); *F01N 2900/1406* (2013.01); *F01N 2900/1614* (2013.01); *F01N 2900/1622* (2013.01); *F02D 2200/08* (2013.01)

METHOD FOR REGENERATING LEAN NOX TRAP OF EXHAUST PURIFICATION SYSTEM PROVIDED WITH LEAN NOX TRAP AND SELECTIVE CATALYTIC REDUCTION CATALYST AND EXHAUST PURIFICATION SYSTEM

CROSS-REFERENCE TO RELATED APPLICATION

This application claims the benefit of priority to Korean Patent Application No. 10-2015-0130419 filed in the Korean Intellectual Property Office on Sep. 15, 2015, the entire content of which is incorporated herein by reference.

TECHNICAL FIELD

The present disclosure relates to a method for regenerating a lean NOx trap (LNT) of an exhaust purification system and the exhaust purification system. More particularly, the present disclosure relates to a method for regenerating an LNT of an exhaust purification system having the LNT and a selective catalytic reduction (SCR) catalyst capable of improving purification efficiency of NOx and fuel efficiency and preventing slip of ammonia (NH3).

BACKGROUND

Generally, exhaust gas coming out of an engine through an exhaust manifold flows into a catalytic converter mounted at an exhaust pipe and is purified therein. Then, noise of the exhaust gas is decreased while passing through a muffler, and the exhaust gas is emitted into the air through a tail pipe. The catalytic converter purifies pollutants contained in the exhaust gas. In addition, a particulate filter for trapping particulate matter (PM) contained in the exhaust gas is mounted in the exhaust pipe.

A denitrification catalyst (DeNOx catalyst) converter as the catalytic converter purifies nitrogen oxide (NOx) contained in the exhaust gas. If reducing agents, such as urea, ammonia, carbon monoxide, and hydrocarbon (HC), are supplied to the exhaust gas, the NOx contained in the exhaust gas is reduced in the DeNOx catalyst through oxidation-reduction reaction with the reducing agents.

Recently, a lean NOx trap (LNT) catalyst is used as such a DeNOx catalyst. The LNT catalyst absorbs the NOx contained in the exhaust gas when air/fuel ratio is lean, and releases the absorbed NOx and reduces the released nitrogen oxide and the nitrogen oxide contained in the exhaust gas when the air/fuel ratio is rich atmosphere (hereinafter, it will be called a 'regeneration of the LNT').

General diesel engines operate at the lean air/fuel ratio, however, it is required to artificially adjust air/fuel ratio to be the rich air/fuel ratio in order to release the absorbed NOx from the LNT. For this, a timing for releasing the NOx absorbed in the LNT (i.e., regeneration timing) needs to be determined.

In addition, if a temperature of the exhaust gas is high (e.g., the temperature of the exhaust gas is higher than 400° C.), the LNT cannot remove the NOx contained in the exhaust gas. In order to solve such problems, a selective catalytic reduction (SCR) catalyst together with the LNT is used.

If the LNT and the SCR catalyst are independently controlled, the following problems may occur due to different characteristics of the LNT and the SCR catalyst.

When the temperature at the upstream of the SCR catalyst is low, purification efficiency of the SCR catalyst may deteriorate and NOx exhaust may increase. In this case, the LNT instead of the SCR catalyst must remove the NOx.

In addition, the NOx is removed by the LNT when an NH3 amount stored in the SCR catalyst is high, the NH3 may be slipped from the SCR catalyst. In this case, the regeneration of the LNT must stop until the NH3 amount stored in the SCR catalyst is smaller than or equal to a predetermined amount.

The above information disclosed in this Background section is only for enhancement of understanding of the background of the invention, and therefore, it may contain information that does not form the prior art that is already known in this country to a person of ordinary skill in the art.

SUMMARY

The present disclosure has been made in an effort to provide a method of regenerating of a lean NOx trap (LNT) of an exhaust purification system provided with the LNT and a selective catalytic reduction (SCR) catalyst, capable of improving NOx purification efficiency and fuel economy and preventing slip of an NH3 by precisely determining regeneration timing of the LNT considering a state of the SCR catalyst, and the exhaust purification system.

A method for regenerating a lean NOx trap (LNT) of an exhaust purification system provided with the LNT and a selective catalytic reduction (SCR) catalyst according to an exemplary embodiment in the present disclosure includes: determining whether a regeneration release condition of the LNT is satisfied; determining whether a regeneration demand condition of the LNT is satisfied; and performing regeneration of the LNT when the regeneration release condition of the LNT and the regeneration demand condition of the LNT are satisfied, wherein satisfaction of the regeneration release condition of the LNT is determined based on an NOx amount absorbed in the LNT, an NH3 amount stored in the SCR catalyst and temperature at an upstream of the SCR catalyst.

The regeneration release condition of the LNT may be satisfied when the NOx amount absorbed in the LNT is greater than or equal to a threshold NOx amount, and a final factor calculated based on a base factor, a first correction factor according to the NH3 amount stored in the SCR catalyst, and a second correction factor according to the temperature at the upstream of the SCR catalyst is greater than or equal to a predetermined value.

The first correction factor may decrease or may be maintained as the NH3 amount stored in the SCR catalyst increases.

The second correction factor may increase or may be maintained as the temperature at the upstream of the SCR catalyst is lowered.

The regeneration release condition of the LNT may be satisfied when a final factor calculated based on a base factor according to the NOx amount absorbed in the LNT, a first correction factor according to the NH3 amount stored in the SCR catalyst, and a second correction factor according to the temperature at the upstream of the SCR catalyst is greater than or equal to a predetermined value.

The first correction factor may decrease or may be maintained as the NH3 amount stored in the SCR catalyst increases.

The second correction factor may increase or may be maintained as the temperature at the upstream of the SCR catalyst is lowered.

The method of regenerating the LNT may further include: determining whether a regeneration stop condition of the LNT is satisfied during performing the regeneration of the LNT; and stopping the regeneration of the LNT and switching to a normal operation mode if the regeneration stop condition of the LNT is satisfied.

An exhaust purification system according to another exemplary embodiment of the present invention may include: an engine including an injector for injecting fuel thereinto, generating power by burning mixture of air and the fuel, and exhausting the exhaust gas generated at combustion process to the exterior thereof through an exhaust pipe; a lean NOx trap (LNT) mounted on the exhaust pipe, and configured to absorb nitrogen oxide (NOx) contained in the exhaust gas at a lean air/fuel ratio, to release the absorbed nitrogen oxide at a rich air/fuel ratio, and to reduce the nitrogen oxide contained in the exhaust gas or the released nitrogen oxide using reductant including carbon or hydrogen contained in the exhaust gas; a dosing module mounted at the exhaust pipe downstream of the LNT and configured to directly inject reducing agent into the exhaust gas; a selective catalytic reduction (SCR) catalyst mounted at the exhaust pipe downstream of the dosing module and configured to reduce the NOx contained in the exhaust gas by using the reducing agent injected by the dosing module; and a controller configured to perform denitrification (DeNOx) by using the LNT and/or the SCR catalyst according to a driving condition of the engine, wherein the controller performs regeneration of the LNT if both of a regeneration demand condition of the LNT and a regeneration release condition of the LNT are satisfied, and wherein the controller determines whether the regeneration release condition of the LNT is satisfied based on an NOx amount absorbed in the LNT, an NH3 amount stored in the SCR catalyst, and a temperature at an upstream of the SCR catalyst.

The regeneration release condition of the LNT may be satisfied when the NOx amount absorbed in the LNT is greater than or equal to a threshold NOx amount, and a final factor calculated based on a base factor, a first correction factor according to the NH3 amount stored in the SCR catalyst, and a second correction factor according to the temperature at the upstream of the SCR catalyst is greater than or equal to a predetermined value.

The first correction factor may decrease or may be maintained as the NH3 amount stored in the SCR catalyst increases.

The second correction factor may increase or may be maintained as the temperature at the upstream of the SCR catalyst is lowered.

The regeneration release condition of the LNT may be satisfied when a final factor calculated based on a base factor according to the NOx amount absorbed in the LNT, a first correction factor according to the NH3 amount stored in the SCR catalyst, and a second correction factor according to the temperature at the upstream of the SCR catalyst is greater than or equal to a predetermined value.

The first correction factor may decrease or may be maintained as the NH3 amount stored in the SCR catalyst increases.

The second correction factor may increase or may be maintained as the temperature at the upstream of the SCR catalyst is lowered.

The controller, during performing the regeneration of the LNT, may stop the regeneration of the LNT and may switch into a normal operation mode if the regeneration stop condition of the LNT is satisfied.

As described above, purification efficiency of the NOx may be improved by precisely determining a regeneration timing of the LNT considering a state of the SCR catalyst.

In addition, slip of the NH3 from the SCR catalyst may be prevented.

DETAILED DESCRIPTION OF THE EMBODIMENTS

Exemplary embodiments in the present disclosure will hereinafter be described in detail with reference to the accompanying drawings.

Figure 1:
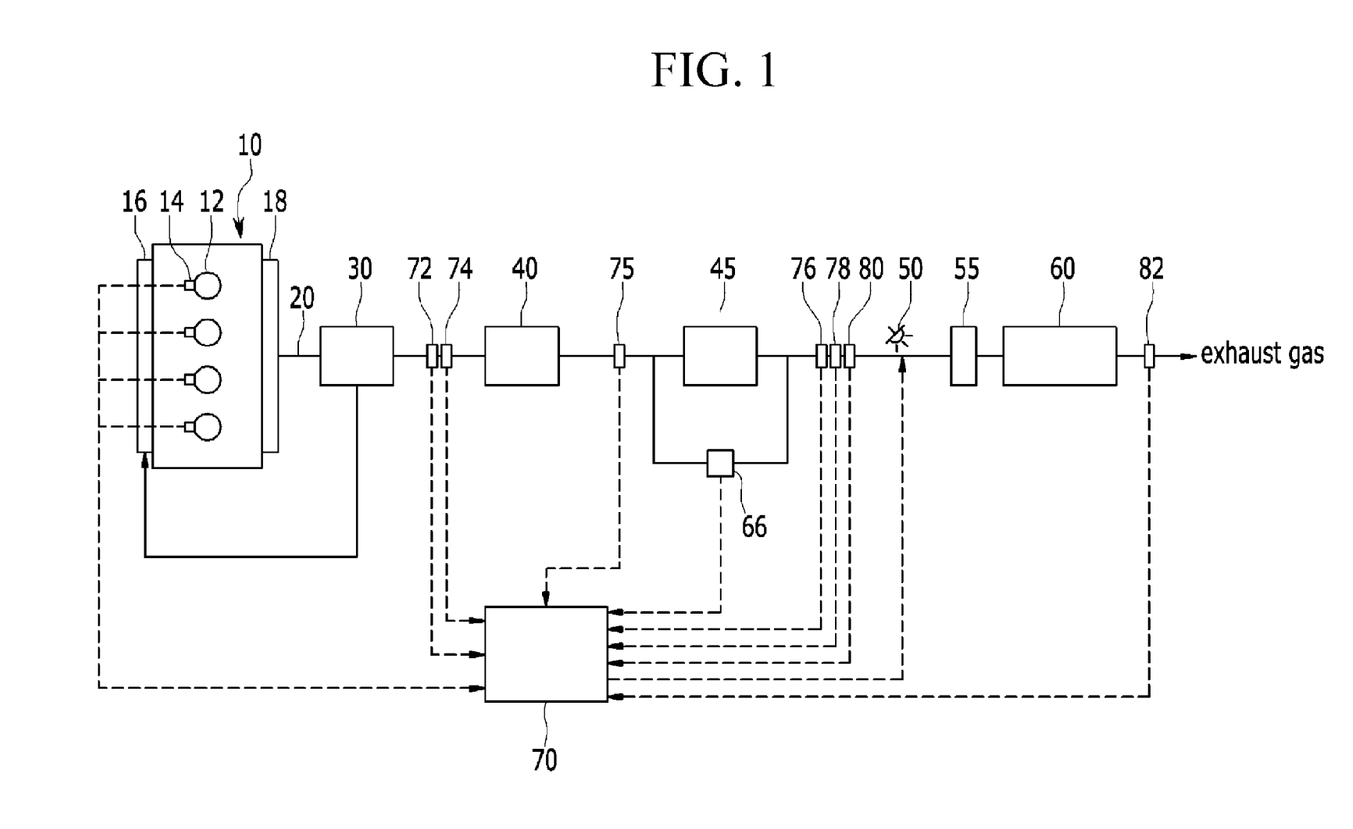
FIG. 1 is a schematic diagram of an exhaust purification system according to an exemplary embodiment in the present disclosure.

FIG. 1 is a schematic diagram of an exhaust purification system according to an exemplary embodiment in the present disclosure.

As shown in FIG. 1, an exhaust system of an internal combustion engine includes an engine 10, an exhaust pipe 20, an exhaust gas recirculation (EGR) apparatus 30, a lean NOx trap (LNT) 40, a particulate filter 45, a dosing module 50, a selective catalytic reduction (SCR) catalyst 60, and a controller 70.

The engine 10 burns air/fuel mixture in which fuel and air are mixed so as to convert chemical energy into mechanical energy. The engine 10 is connected to an intake manifold 16 so as to receive the air in a combustion chamber 12, and is connected to an exhaust manifold 18 such that the exhaust gas generated in combustion process is gathered in the exhaust manifold 18 and is exhausted to the exterior. An injector 14 is mounted in the combustion chamber 12 so as to inject the fuel into the combustion chamber 12.

A diesel engine is exemplified herein, but a lean-burn gasoline engine may be used. In a case that the gasoline engine is used, the air/fuel mixture flows into the combustion chamber 12 through the intake manifold 16, and a spark plug (not shown) is mounted at an upper portion of the combustion chamber 12. In addition, if a gasoline direct injection (GDI) engine is used, the injector 14 is mounted at the upper portion of the combustion chamber 12.

The exhaust pipe 20 is connected to the exhaust manifold 18 so as to exhaust the exhaust gas to the exterior of a vehicle. The LNT 40, the particulate filter 45, the dosing module 50 and the SCR catalyst 60 are mounted on the exhaust pipe 20 so as to remove hydrocarbon, carbon monoxide, a particulate matter, and nitrogen oxide (NOx) contained in the exhaust gas.

The exhaust gas recirculation apparatus 30 is mounted on the exhaust pipe 20, and a portion of the exhaust gas exhausted from the engine 10 is supplied back to the engine 10 through the exhaust gas recirculation apparatus 30. In addition, the exhaust gas recirculation apparatus 30 is connected to the intake manifold 16 to control a combustion temperature by mixing the portion of the exhaust gas with the air. Such control of the combustion temperature is performed by controlling amount of the exhaust gas supplied back to the intake manifold 16 by control of the controller 70. Therefore, a recirculation valve (not shown) controlled by the controller 70 may be mounted on a line connecting the exhaust gas recirculation apparatus 30 and the intake manifold 16.

A first oxygen sensor 72 is mounted on the exhaust pipe 20 downstream of the exhaust gas recirculation apparatus 30. The first oxygen sensor 72 detects oxygen amount in the exhaust gas passing through the exhaust gas recirculation apparatus 30 and transmits a signal corresponding thereto to the controller 70 so as to help lean/rich control of the exhaust gas performed by the controller 70. In this specification, the detected value by the first oxygen sensor 72 is called a lambda at an upstream of the LNT.

In addition, a first temperature sensor 74 is mounted on the exhaust pipe 20 downstream of the exhaust gas recirculation apparatus 30 and detects temperature of the exhaust gas passing through the exhaust gas recirculation apparatus 30.

The LNT 40 is mounted on the exhaust pipe 20 downstream of the exhaust gas recirculation apparatus 30. The LNT 40 absorbs the nitrogen oxide (NOx) contained in the exhaust gas at a lean air/fuel ratio, and releases the absorbed nitrogen oxide and reduces the nitrogen oxide contained in the exhaust gas or the released nitrogen oxide at a rich air/fuel ratio. In addition, the LNT 40 may oxidize carbon monoxide (CO) and hydrocarbon (HC) contained in the exhaust gas.

Herein, the hydrocarbon represents all compounds including carbon and hydrogen contained in the exhaust gas and the fuel.

A second temperature sensor 75 is mounted on the exhaust pipe 20 downstream of the LNT 40. The second temperature sensor 75 detects a temperature of the exhaust gas flowing into the particulate filter 45 and transmits a signal corresponding thereto to the controller 70.

The particulate filter 45 is mounted on the exhaust pipe 20 downstream of the LNT 40 and traps the particulate matter contained in the exhaust gas. In addition, the particulate filter 45 burns the trapped particulate matter so as to remove the particulate matter. Typically, the particulate filter 45 includes a plurality of inlet channels and outlet channels. Each of the inlet channels includes an end that is open and another end that is blocked, and receives the exhaust gas from a front end of the particulate filter 45. In addition, each of the outlet channels includes an end that is blocked and another end that is open, and discharges the exhaust gas from the particulate filter 45. The exhaust gas flowing into the particulate filter 45 through the inlet channels enters the outlet channels through porous walls separating the inlet channels and the outlet channels. After that, the exhaust gas is discharged from the particulate filter 45 through the outlet channels. While the exhaust gas passes through the porous walls, the particulate matter contained in the exhaust gas is trapped.

A pressure difference sensor 66 is mounted on the exhaust pipe 20. The pressure difference sensor 66 detects pressure difference between a front end portion and a rear end portion of the particulate filter 45 and transmits a signal corresponding thereto to the controller 70. The controller 70 may control the particulate filter 45 to be regenerated if the pressure difference detected by the pressure difference sensor 66 is greater than predetermined pressure. The injector 14 post-injects the fuel so as to burn the particulate matter trapped in the particulate filter 45.

A second oxygen sensor 76, a third temperature sensor 78, and a first NOx sensor 80 are mounted on the exhaust pipe 20 at a downstream of the particulate filter 45.

The second oxygen sensor 76 detects an oxygen amount contained in exhaust gas flowing into the particulate filter 45 and transmits a signal corresponding thereto to the controller 70. The controller 70 may perform the lean/rich control of the exhaust gas based on the detected values by the first oxygen sensor 72 and the second oxygen sensor 76. In this specification, the detected value by the second oxygen sensor 76 is called a lambda at a downstream of the LNT.

The third temperature sensor 78 detects a temperature of the exhaust gas flowing into the SCR catalyst 60 and transmits a signal corresponding thereto to the controller 70.

The first NOx sensor 80 detects an NOx amount contained in the exhaust gas flowing into the SCR catalyst 60 and transmits a signal corresponding thereto to the controller 70. The NOx amount detected by the first NOx sensor 80 may determine amount of reducing agent injected by the dosing module 50.

The dosing module 50 is mounted on the exhaust pipe 20 at an upstream of the SCR catalyst 60 and injects the reducing agent into the exhaust gas by control of the controller 70. Typically, the dosing module 50 injects urea and the injected urea is hydrolyzed and converted into ammonia. However, the reducing agent is not limited to the ammonia.

A mixer 55 is mounted on the exhaust pipe 20 downstream of the dosing module 50 and mixes the reducing agent and the exhaust gas evenly.

The SCR catalyst 60 is mounted on the exhaust pipe 20 at the downstream of the mixer 55 and reduces the nitrogen oxide contained in the exhaust gas using the reducing agent injected by the dosing module 50.

In addition, a second NOx sensor 82 is mounted on the exhaust pipe 20 at the downstream of the SCR catalyst 60. The second NOx sensor 82 detects the amount of the nitrogen oxide contained in the exhaust gas exhausted from the SCR catalyst 60 and transmits a signal corresponding thereto to the controller 70. The controller 70 may check based on the detected value by the second NOx sensor 82 whether the nitrogen oxide contained in the exhaust gas is normally removed in the SCR catalyst 60. That is, the second NOx sensor 82 may evaluate performance of the SCR catalyst 60.

The controller 70 determines a driving condition of the engine based on the signals transmitted from each sensor, and performs the lean/rich control and controls the amount of the reducing agent injected by the dosing module 50 based on the driving condition of the engine. For example, the controller 70 may release the NOx from the LNT 40 by controlling the air/fuel ratio to be rich atmosphere and may reduce the released NOx by using reductant contained in the exhaust gas (in this specification, it will be called the 'regeneration of the LNT'). In addition, the controller 70 may remove the NOx at the SCR catalyst 60 by injecting the reducing agent. The lean/rich control may be performed by controlling fuel amount injected by the injector 14.

The controller 70 includes a plurality of maps, characteristics of the LNT, and correction coefficients, and may determine a regeneration start timing and a regeneration end timing based thereon. The plurality of maps, characteristics of the LNT, and correction coefficients may be set through a number of experiments.

In addition, the controller 70 controls regeneration of the particulate filter 45 and desulfurization of the LNT 40.

For these purposes, the controller 70 can be realized by one or more processors activated by a predetermined program, and the predetermined program can be programmed to perform each step of a method of regenerating the LNT according to an exemplary embodiment.

Figure 2:
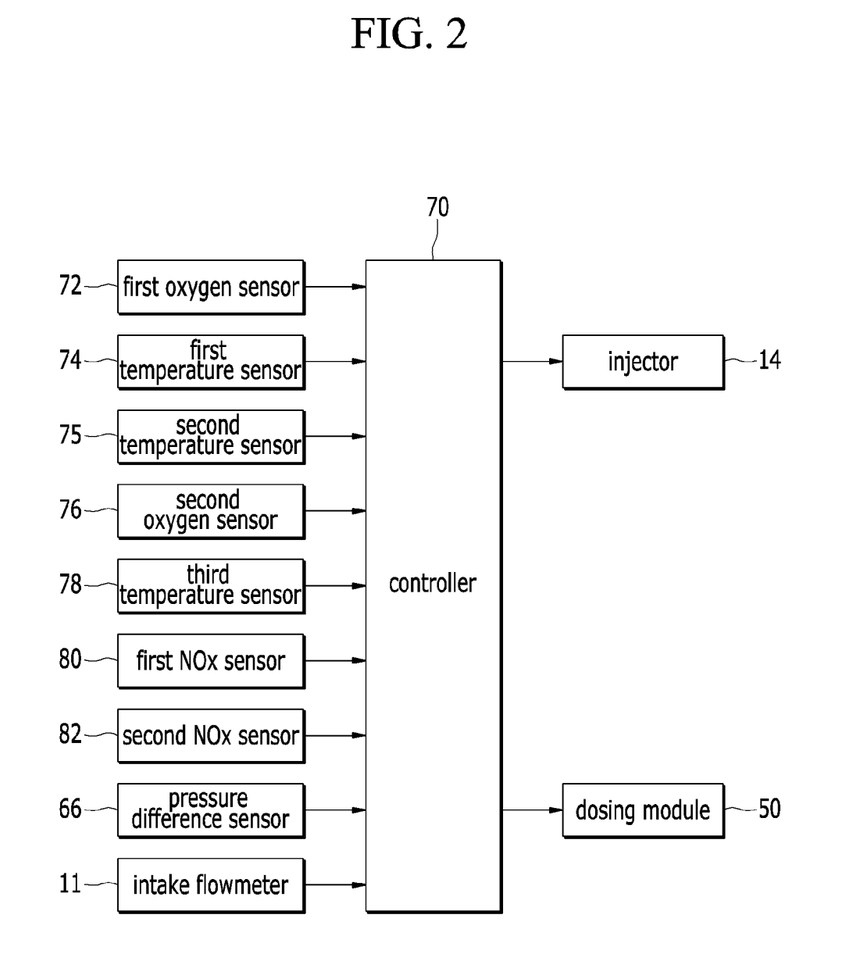
FIG. 2 is a block diagram illustrating relationship of an input and output of a controller used in a method of regenerating an LNT of an exhaust purification system according to an exemplary embodiment in the present disclosure.

FIG. 2 is a block diagram illustrating relationship of an input and output of a controller used in a method of regenerating an LNT of an exhaust purification system according to an exemplary embodiment in the present disclosure.

As shown in FIG. 2, the first oxygen sensor 72, the first temperature sensor 74, the second temperature sensor 75, the second oxygen sensor 76, the third temperature sensor 78, the first NOx sensor 80, the second NOx sensor 82, the pressure difference sensor 66 and an intake flowmeter 11 are electrically connected to the controller 70, and transmit the detected values to the controller 70.

The first oxygen sensor 72 detects the oxygen amount in the exhaust gas passing through the exhaust gas recirculation apparatus 30 and transmits the signal corresponding thereto to the controller 70. The controller 70 may perform the lean/rich control of the exhaust gas based on the oxygen amount in the exhaust gas detected by the first oxygen sensor 72. The detected value by the first oxygen sensor 72 may be represented as a lambda λ. The lambda means a ratio of actual air/fuel ratio to stoichiometric air/fuel ratio. If the lambda is greater than 1, the air/fuel ratio is lean. The air/fuel ratio is rich if the lambda is smaller than 1.

The first temperature sensor 74 detects the temperature of the exhaust gas passing through the exhaust gas recirculation apparatus 30 and transmits the signal corresponding thereto to the controller 70.

The second temperature sensor 75 detects the temperature of the exhaust gas flowing into the particulate filter 45 and transmits the signal corresponding thereto to the controller 70.

The second oxygen sensor 76 detects the oxygen amount in the exhaust gas flowing into the SCR catalyst 60 and transmits the signal corresponding thereto to the controller 70.

The third temperature sensor 78 detects the temperature of the exhaust gas flowing into the SCR catalyst 60 and transmits the signal corresponding thereto to the controller 70.

The first NOx sensor 80 detects the NOx amount contained in the exhaust gas flowing into the SCR catalyst 60 and transmits the signal corresponding thereto to the controller 70.

The second NOx sensor 82 detects the NOx amount contained in the exhaust gas exhausted from the SCR catalyst 60 and transmits the signal corresponding thereto to the controller 70.

The pressure difference sensor 66 detects the pressure difference between a front end portion and a rear end portion of the particulate filter 45 and transmits the signal corresponding thereto to the controller 70.

The intake flowmeter 11 detects an intake air flow supplied to an intake system of the engine 10 and transmits the signal corresponding thereto to the controller 70.

The controller 70 determines the driving condition of the engine, the fuel injection amount, the fuel injection timing, a fuel injection pattern, the injection amount of the reducing agent, the regeneration timing of the particulate filter 45, the desulfurization/regeneration timing of the LNT 40, and the amount of the reducing agent that is injected by the dosing module 50 based on the transmitted value, and outputs a signal for controlling the injector 14 and the dosing module 50 to the injector 14 and the dosing module 50. In addition, the controller 70 may determine the regeneration start timing and the regeneration end timing of the LNT 40 based on the transmitted values.

A plurality of sensors other than the sensors illustrated in FIG. 2 may be mounted in the exhaust purification device according to the exemplary embodiment. For better comprehension and ease of description, however, description of the plurality of sensors will be omitted.

Hereinafter, referring to FIG. 3 to FIG. 5, a method of regenerating the LNT according to an exemplary embodiment in the present disclosure will be described in detail.

Figure 3:
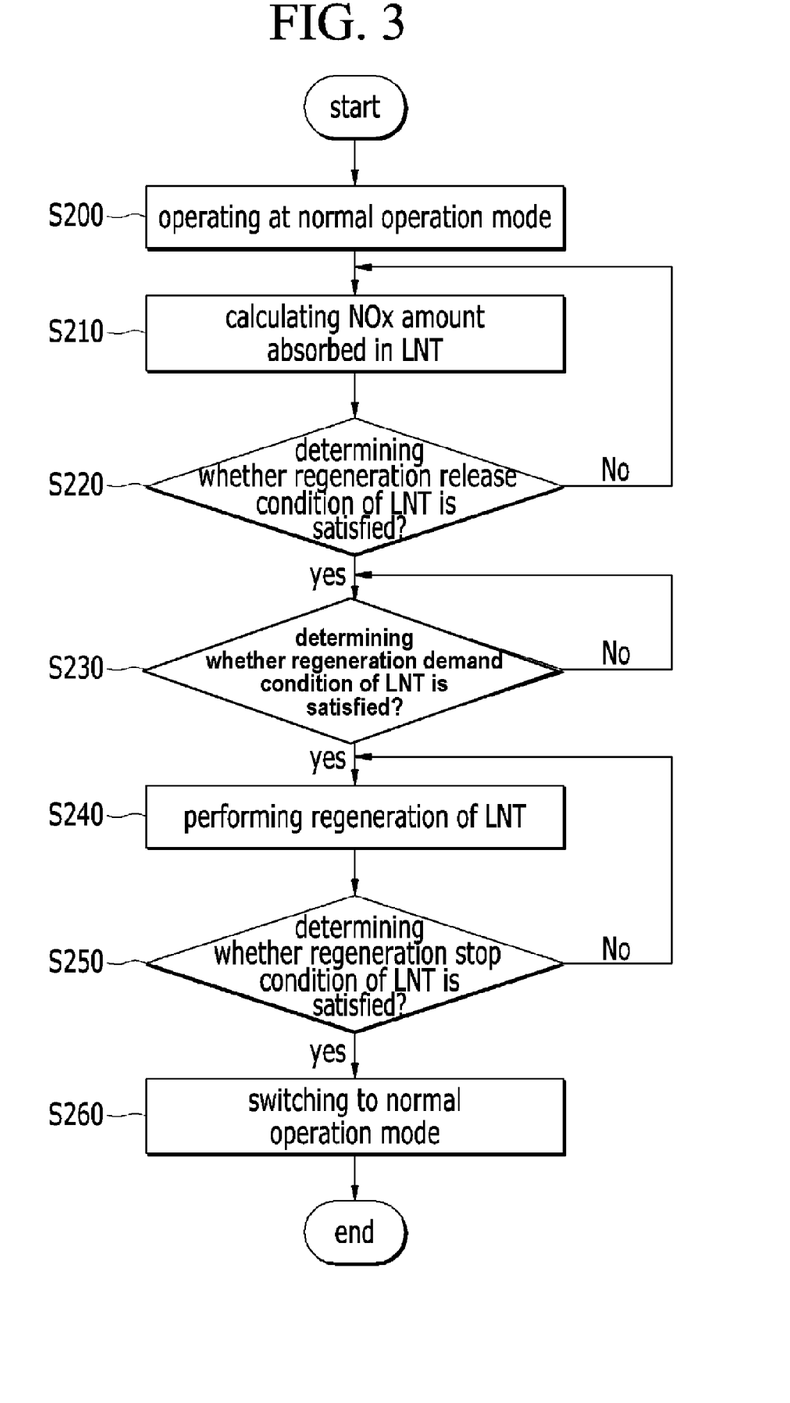
FIG. 3 is a flowchart of a method of regenerating an LNT according to an exemplary embodiment in the present disclosure.

As shown in FIG. 3, the method of regenerating the LNT according to the exemplary embodiment is performed when the vehicle drives. When the vehicle starts, the controller 70 controls the engine 10 to be operated at a normal operation mode at step S200. Simultaneously, the controller 70 calculates an NOx amount absorbed in the LNT 40 at step S210. The NOx amount absorbed in the LNT 40 may be calculated based on the NOx amount generated according to a driving condition of the engine 10 (that can be detected by an additional NOx sensor or be calculated by modeling), an NOx absorption efficiency according to a temperature of the LNT 40 (a temperature of the exhaust gas passing through the LNT 40), an NOx absorption efficiency according to sulfur poisoning, and so on.

If the NOx amount absorbed in the LNT 40 is calculated, the controller 70 determines whether a regeneration release condition of the LNT is satisfied at step S220.

Hereinafter, referring to FIG. 4 and FIG. 5, whether the regeneration release condition of the LNT is satisfied will be described in further detail.

Figure 4:
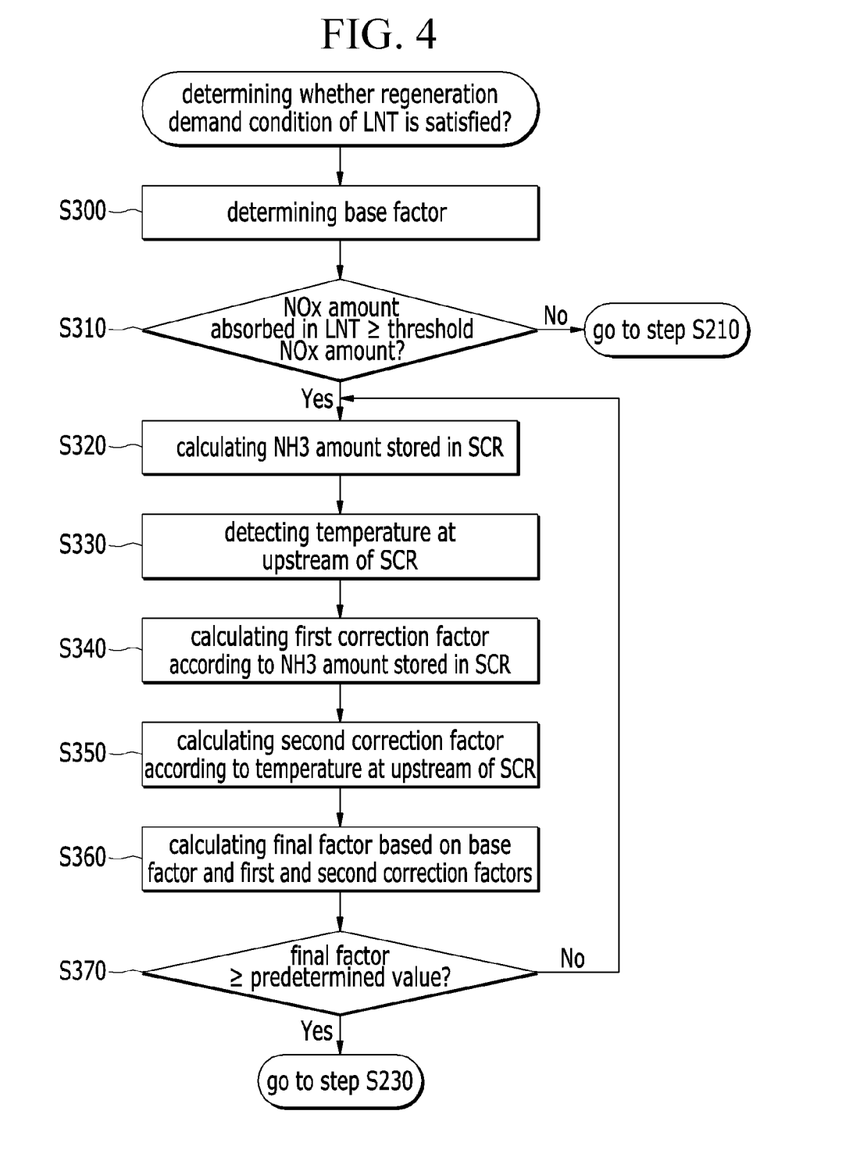
FIG. 4 illustrates one example of determining whether a regeneration release condition of an LNT is satisfied in FIG. 3.

FIG. 4 illustrates one example of determining whether a regeneration release condition of an LNT is satisfied in FIG. 3.

The controller 70 determines a base factor at step S300. The base factor adjusts a regeneration timing of the LNT 40 according to a state of the SCR catalyst 60. The base factor may be predetermined to a specific value or may be changed according to the driving condition of the engine 10. The base factor used in the exemplary embodiment illustrated in FIG. 4 is a predetermined specific value and is not changed. However, the base factor is not limited to that in the exemplary embodiment.

If the base factor is determined, the controller 70 determines whether the NOx amount absorbed in the LNT 40 is greater than or equal to a threshold NOx amount at step S310. The threshold NOx amount according to a temperature at the upstream of the LNT 40, the NOx amount generated according to the driving condition of the engine 10, and the sulfur poisoning in the LNT 40 is predetermined in a memory (not shown). Therefore, the controller 70 reads the threshold NOx amount according to the driving condition of the engine 10, the temperature at the upstream of the LNT 40, and the sulfur poisoning in the LNT 40, and compares the NOx amount absorbed in the LNT 40 with the threshold NOx amount.

If the NOx amount absorbed in the LNT 40 is smaller than the threshold NOx amount at the step S310, the controller 70 returns to the step S210 and continues to calculate the NOx amount absorbed in the LNT 40.

If the NOx amount absorbed in the LNT 40 is greater than or equal to the threshold NOx amount at the step S310, the controller 70 calculates an NH3 amount stored in the SCR catalyst 60 at step S320 and detects the temperature at the upstream of the SCR catalyst 60 (the temperature of the exhaust pass at the upstream of the SCR catalyst 60) at step S330. The NH3 amount stored in the SCR catalyst 60 can be calculated from a predetermined map based on the temperature of the SCR catalyst 60, a lambda at the upstream of the SCR catalyst 60, an NOx purification efficiency of the SCR catalyst 60, and the temperature at the upstream of the SCR catalyst 60 may be detected by the third temperature sensor 78 or may be calculated from the detected value by the third temperature sensor 78.

Then, the controller 70 calculates a first correction factor according to the NH3 amount stored in the SCR catalyst 60 at step S340. The first correction factor may decrease or be maintained as the NH3 amount stored in the SCR catalyst 60 increases. That is, as the NH3 amount stored in the SCR catalyst 60 increases, the regeneration timing of the LNT 40 is delayed such that the NOx is mainly removed by the SCR catalyst 60. Therefore, NH3 slip from the SCR catalyst 60 may be prevented.

In addition, the controller 70 calculates a second correction factor according to the temperature at the upstream of the SCR catalyst 60 at step S350. The second correction factor may increase or be maintained as the temperature at the upstream of the SCR catalyst 60 is lowered. That is, as the temperature at the upstream of the SCR catalyst 60 is lowered, the regeneration timing of the LNT 40 is made earlier such that the NOx is mainly removed by the LNT 40. Therefore, purification efficiency of the NOx may be improved.

The controller 70 then calculates a final factor based on the base factor and the first and second correction factors at step S360. For example, the final factor, but is not limited to, may be calculated by multiplying the base factor and the first and second correction factors.

Then, the controller 70 determines whether the final factor is greater than or equal to a predetermined value at step S370. If the final factor is smaller than the predetermined value at the step S370, the controller 70 returns to the step S320. If the final factor is greater than or equal to the predetermined value at the step S370, the controller 70 determines that the regeneration release condition of the LNT is satisfied and goes to step S230.

Figure 5:
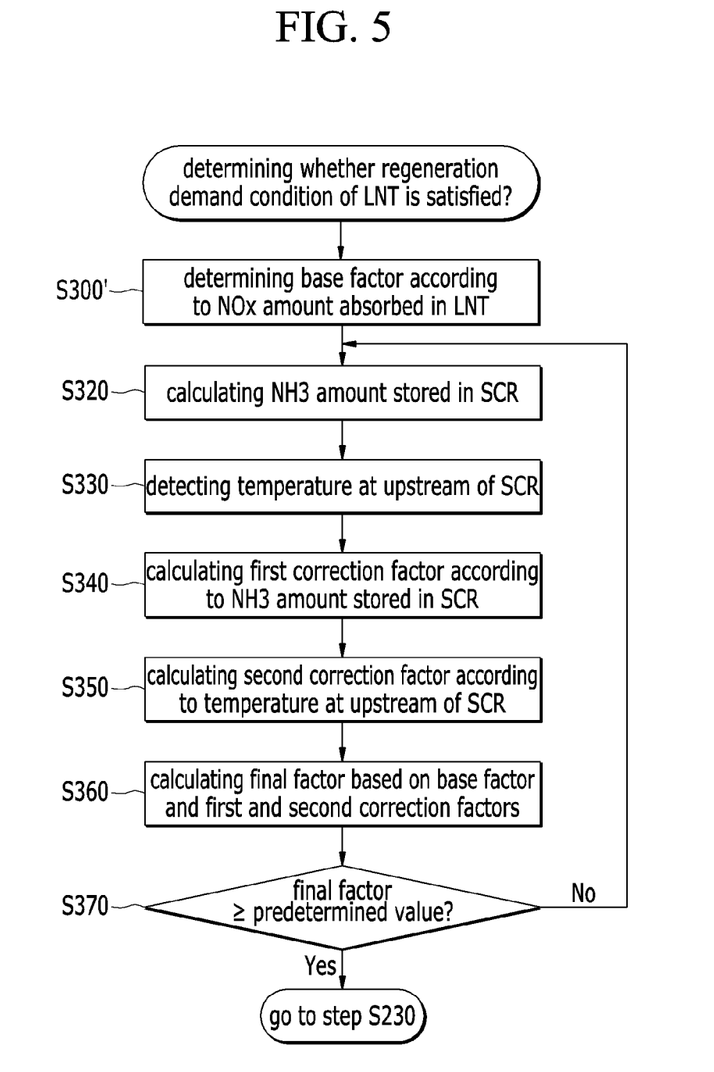
FIG. 5 illustrates another example of determining whether a regeneration release condition of an LNT is satisfied in FIG. 3.

FIG. 5 illustrates another example of determining whether a regeneration release condition of an LNT is satisfied in FIG. 3. The base factor is determined according to the NOx amount absorbed in the LNT 40 in the exemplary embodiment illustrated in FIG. 5. Since other steps in FIG. 5 are similar to those in FIG. 4, the exemplary embodiment illustrated in FIG. 5 will be briefly described.

That is, the controller 70 determines the base factor according to the NOx amount absorbed in the LNT 40 at step S300'. The base factor may increase or be maintained as the NOx amount absorbed in the LNT 40 increases. That is, as the NOx amount absorbed in the LNT 40 increases, the regeneration timing of the LNT 40 is made earlier. Therefore, purification efficiency of the NOx may be improved.

The controller 70 calculates the NH3 amount stored in the SCR catalyst 60 at the step S320 and detects the temperature at the upstream of the SCR catalyst 60 at the step S330. In addition, the controller 70 calculates the first correction factor according to the NH3 amount stored in the SCR catalyst 60 at the step S340 and calculates the second correction factor according to the temperature at the upstream of the SCR catalyst 60 at the step S350.

After that, the controller 70 calculates the final factor based on the base factor and the first and second correction factors at the step S360, and determines that the regeneration release condition of the LNT is satisfied and goes to the step S230 if the final factor is greater than or equal to the predetermined value.

Referring to FIG. 3, when the regeneration release condition of the LNT is not satisfied at the step S220, the controller 70 returns to the S210 and continues to calculate the NOx amount absorbed in the LNT 40. If the regeneration release condition of the LNT is satisfied at the step S220, the controller 70 determines whether a regeneration demand condition of the LNT is satisfied at the step S230. That is, the controller 70 determines whether an engine speed, an engine torque, the temperature of the LNT 40, a coolant temperature, an ambient temperature, a vehicle speed, and a gear ratio satisfy a condition for entering a rich mode for regeneration of the LNT 40.

If the regeneration demand condition of the LNT is not satisfied at the step S230, the controller 70 repeats the step S230 until the regeneration demand condition of the LNT is satisfied. If the regeneration demand condition of the LNT is satisfied at the step S230, the controller 70 performs the regeneration of the LNT 40 at step S240. That is, the NOx absorbed in the LNT 40 is released by making rich atmosphere. The released NOx is reduced by reductant contained in the exhaust gas.

During performing the regeneration of the LNT 40, the controller 70 determines whether a regeneration stop condition of the LNT 40 is satisfied at step S250. The regeneration stop condition of the LNT 40 is satisfied if a difference between lambdas at the upstream and the downstream of the LNT 40 is smaller than a predetermined value, an NOx release is greater than or equal to a predetermined release, or a regeneration duration of the LNT is longer than or equal to a predetermined duration.

If the regeneration stop condition of the LNT 40 is not satisfied at the step S250, the controller 70 continues to perform the regeneration of the LNT 40 at the step S240. If the regeneration stop condition of the LNT 40 is satisfied at the step S250, the controller 70 stops the regeneration of the LNT 40 and switches into the normal operation mode at step S260.

While this invention has been described in connection with what is presently considered to be practical exemplary embodiments, it is to be understood that the invention is not limited to the disclosed embodiments, but on the contrary, is intended to cover various modifications and equivalent arrangements included within the spirit and scope of the appended claims.

What is claimed is:

1. A method for regenerating a lean NOx trap (LNT) of an exhaust purification system having the LNT and a selective catalytic reduction (SCR) catalyst, comprising:
   determining whether a regeneration release condition of the LNT is satisfied;
   determining whether a regeneration demand condition of the LNT is satisfied; and
   performing regeneration of the LNT when the regeneration release condition of the LNT and the regeneration demand condition of the LNT are satisfied,
   wherein satisfaction of the regeneration release condition of the LNT is determined based on an NOx amount absorbed in the LNT, an NH3 amount stored in the SCR catalyst, and temperature at an upstream of the SCR catalyst.

2. The method of claim 1, wherein the regeneration release condition of the LNT is satisfied when the NOx amount absorbed in the LNT is greater than or equal to a threshold NOx amount, and a final factor calculated based on a base factor, a first correction factor according to the NH3 amount stored in the SCR catalyst, and a second correction factor according to the temperature at the upstream of the SCR catalyst is greater than or equal to a predetermined value.

3. The method of claim 2, wherein the first correction factor decreases or is maintained as the NH3 amount stored in the SCR catalyst increases.

4. The method of claim 2, wherein the second correction factor increases or is maintained as the temperature at the upstream of the SCR catalyst is lowered.

5. The method of claim 1, wherein the regeneration release condition of the LNT is satisfied when a final factor calculated based on a base factor according to the NOx amount absorbed in the LNT, a first correction factor according to the NH3 amount stored in the SCR catalyst, and a second correction factor according to the temperature at the upstream of the SCR catalyst is greater than or equal to a predetermined value.

6. The method of claim 5, wherein the first correction factor decreases or is maintained as the NH3 amount stored in the SCR catalyst increases.

7. The method of claim 5, wherein the second correction factor increases or is maintained as the temperature at the upstream of the SCR catalyst is lowered.

8. The method of claim 1, further comprising:
determining whether a regeneration stop condition of the LNT is satisfied during performing the regeneration of the LNT; and
stopping the regeneration of the LNT and switching to a normal operation mode when the regeneration stop condition of the LNT is satisfied.

9. An exhaust purification system comprising:
an engine including an injector which injects fuel thereinto, generating power by burning a mixture of air and the fuel, and exhausting the exhaust gas generated at combustion process to outside through an exhaust pipe;
a lean NOx trap (LNT), which is mounted on the exhaust pipe, absorbing nitrogen oxide (NOx) contained in the exhaust gas at a lean air/fuel ratio, releasing the absorbed nitrogen oxide at a rich air/fuel ratio, and to reduce the nitrogen oxide contained in the exhaust gas or the released nitrogen oxide using a reductant including carbon or hydrogen contained in the exhaust gas;
a dosing module mounted at an exhaust pipe downstream of the LNT and directly injecting a reducing agent into the exhaust gas;
a selective catalytic reduction (SCR) catalyst mounted at the exhaust pipe downstream of the dosing module and reducing the NOx contained in the exhaust gas by using the reducing agent injected by the dosing module; and
a controller configured to perform denitrification (DeNOx) by using the LNT and/or the SCR catalyst according to a driving condition of the engine,
wherein the controller performs regeneration of the LNT when both of a regeneration demand condition of the LNT and a regeneration release condition of the LNT are satisfied, and
wherein the controller determines whether the regeneration release condition of the LNT is satisfied based on an NOx amount absorbed in the LNT, an NH3 amount stored in the SCR catalyst, and a temperature at an upstream of the SCR catalyst.

10. The exhaust purification system of claim 9, wherein the regeneration release condition of the LNT is satisfied when the NOx amount absorbed in the LNT is greater than or equal to a threshold NOx amount, and a final factor calculated based on a base factor, a first correction factor according to the NH3 amount stored in the SCR catalyst, and a second correction factor according to the temperature at the upstream of the SCR catalyst is greater than or equal to a predetermined value.

11. The exhaust purification system of claim 10, wherein the first correction factor decreases or is maintained as the NH3 amount stored in the SCR catalyst increases.

12. The exhaust purification system of claim 10, wherein the second correction factor increases or is maintained as the temperature at the upstream of the SCR catalyst is lowered.

13. The exhaust purification system of claim 9, wherein the regeneration release condition of the LNT is satisfied when a final factor calculated based on a base factor according to the NOx amount absorbed in the LNT, a first correction factor according to the NH3 amount stored in the SCR catalyst, and a second correction factor according to the temperature at the upstream of the SCR catalyst is greater than or equal to a predetermined value.

14. The exhaust purification system of claim 13, wherein the first correction factor decreases or is maintained as the NH3 amount stored in the SCR catalyst increases.

15. The exhaust purification system of claim 13, wherein the second correction factor increases or is maintained as the temperature at the upstream of the SCR catalyst is lowered.

16. The exhaust purification system of claim 9, wherein the controller, during performing the regeneration of the LNT, stops the regeneration of the LNT and switches into a normal operation mode when the regeneration stop condition of the LNT is satisfied.

* * * * *